May 12, 1925.
F. X. LAUTERBUR
DOUGH MOLDING MACHINE
Filed July 8, 1921  2 Sheets-Sheet 1
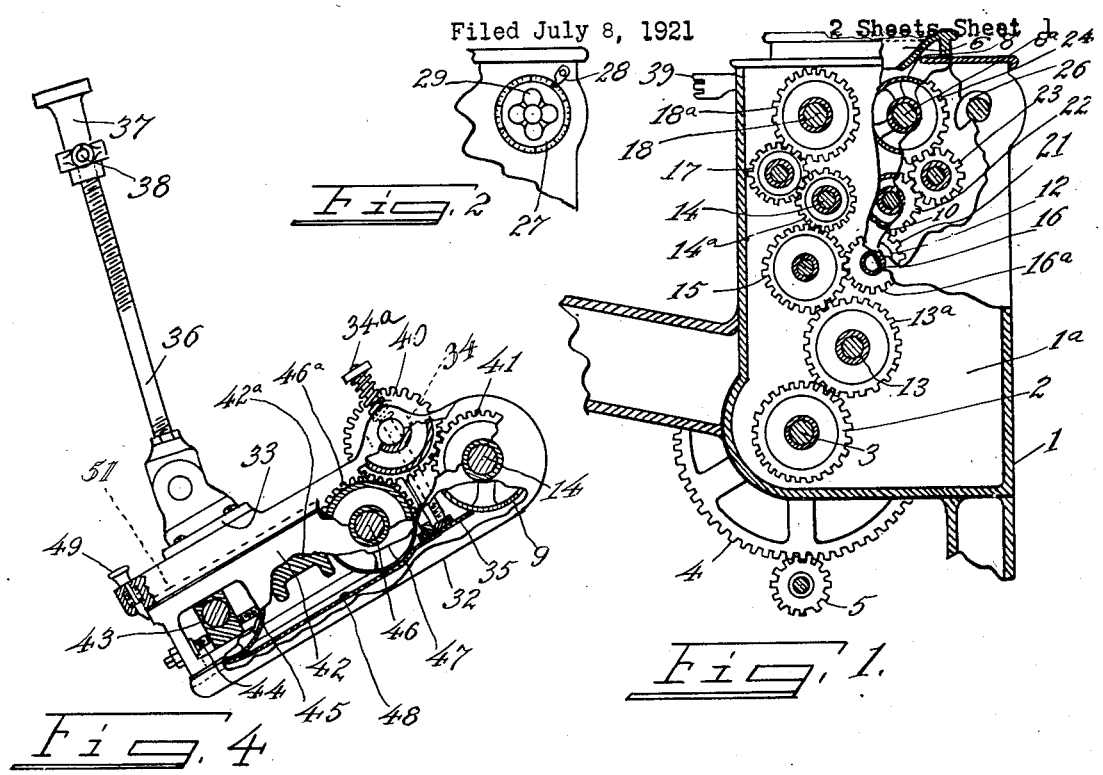

May 12, 1925. 1,537,614
F. X. LAUTERBUR
DOUGH MOLDING MACHINE
Filed July 8, 1921 2 Sheets-Sheet 2
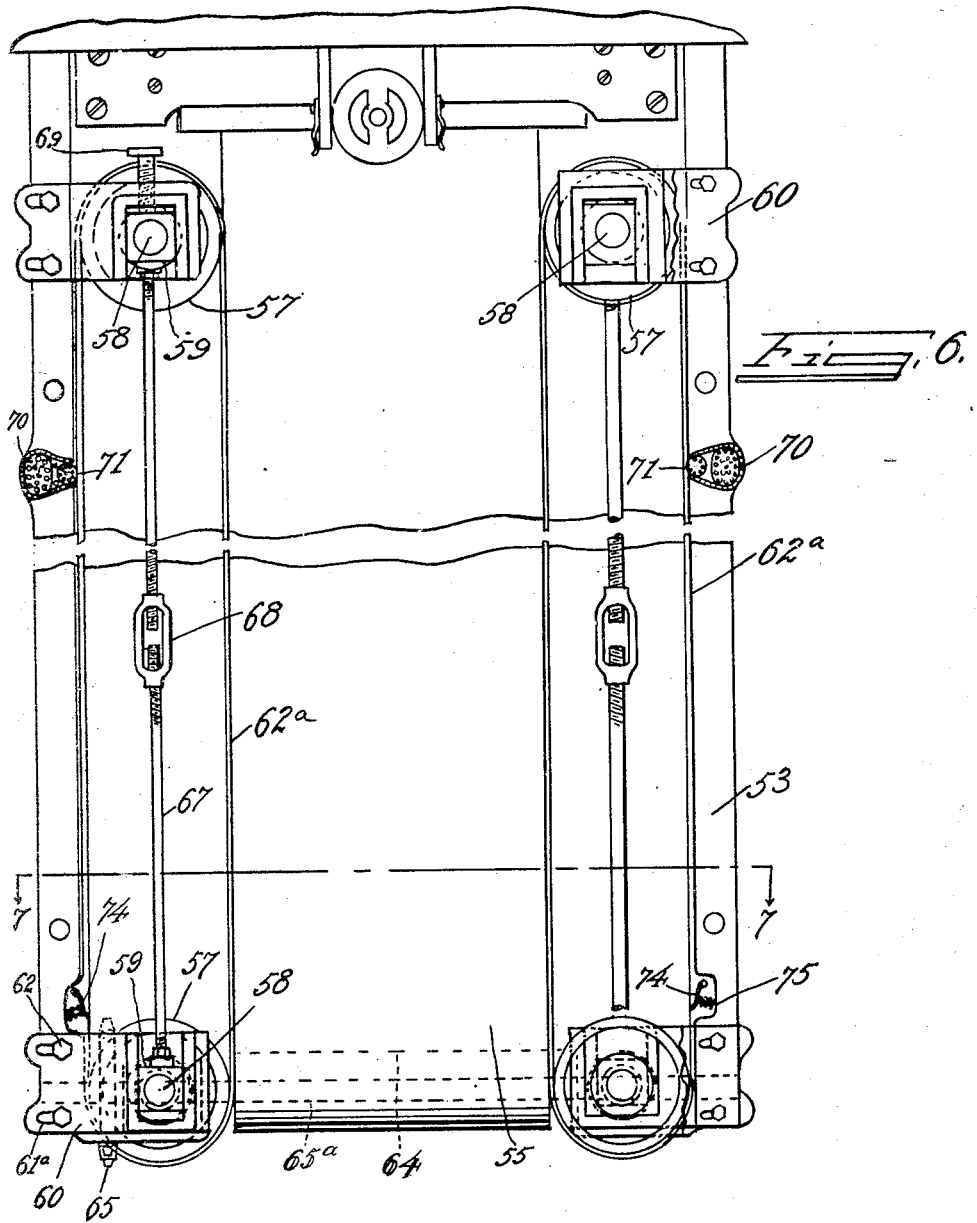
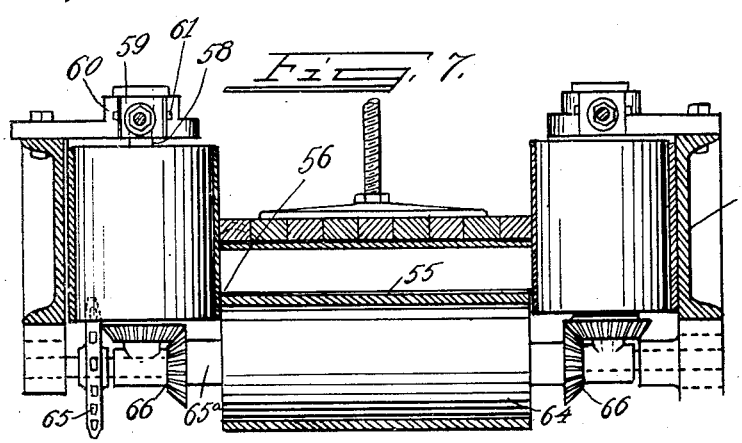
INVENTOR:
Frank X. Lauterbur
BY
Allen & Allen
ATTORNEYS.

Patented May 12, 1925.

1,537,614

UNITED STATES PATENT OFFICE.

FRANK X. LAUTERBUR, OF SIDNEY, OHIO.

DOUGH-MOLDING MACHINE.

Application filed July 8, 1921. Serial No. 483,306.

*To all whom it may concern:*

Be it known that I, FRANK X. LAUTERBUR, a citizen of the United States, and a resident of Sidney, in the county of Shelby and State of Ohio, have invented certain new and useful Improvements in Dough-Molding Machines, of which the following is a full, clear, and exact description, reference being had to the accompanying drawings, forming part of this specification.

My invention relates to machines for molding a quantity of prepared dough into loaves or rolls of proper size for proofing and baking, and in its various parts makes up a complete mechanism for making a loaf of desired size and shape.

Certain details of the frame and driving parts of my machine and the general plan of my machine are closely related to that of my machine of simpler form shown in my former United States Patent No. 1,167,187, dated January 4, 1916.

Among other objects in my present invention is the more complete and accurate relative adjustment of the receiving and sheet forming rolls, said adjustment being facilitated by a calibrated dial arrangement. Furthermore, the trip belt mechanism is not required to fulfill the duty of a sheet forming roll, and is given a wider range of adjustment, as will be noted.

In connection with the trip belt construction it is my object to make it in a frame part and an insert part, whereby the entire belt carrying device can be quickly withdrawn from the machine so as to give access to the other parts thereof for cleaning.

I have also as one of the main objects of my invention herein the production of a kneading element in dough molding machines in which the coil or roll of dough is carried along over a suitably corrugated or wavy surface without extra pull or drag at the ends of the coil, whereby a final article with its ends perfectly straight can be readily produced.

Thus I provide for a traveling base and traveling sides with suitably fixed top members, which when they operate together on the coils or rolls of dough will preserve a straight line formation thereof throughout the kneading action.

I make the traveling sides adjustable for spacing and tension, and throughout the machine have endeavored to improve the adjustability and ease of manipulation of the parts.

I accomplish my objects and other advantages to be noted by that certain construction and arrangement of parts to be hereinafter more specifically pointed out and claimed.

In the drawings,

Figure 1 is a side elevation of the gear box of the machine showing two lines of breakage to illustrate the rolls within the rolling portion of the machine and the gears on a swinging frame at the far side of the machine from the gear box proper.

Figure 2 is a detail elevation of the calibrated dial.

Figure 3 is a central vertical section taken through the machine.

Figure 4 is a detail elevation of the trip belt devices broken away in part, and Figure 4$^a$ is a top plan view thereof.

Figure 5 is an end elevation of the adjusting devices for the receiving and sheet forming rolls.

Figure 6 is a top plan view of the kneading devices, more particularly showing the traveling side wall devices.

Figure 7 is a section on the line 7—7 of Figure 6.

Referring first to the portion of the machine which receives a measured quantity of dough and forms it into a coil, it will be noted that the frame is indicated at 1 with a wall 1$^a$ between the main gear box and the interior of the mechanism, thereby removing danger of lubrication to the gears reaching the dough.

The main driving gear 2 in the gear box is mounted on a shaft 3, on which (exterior of the machine) is a large gear 4 that meshes with the power gear 5. The shaft 3 is the driver for the conveyor devices, and the other gears, to be described, accomplish the rest of the driving for the coil forming parts of the machine.

There is a hopper 6 into which the dough is placed, and below which it comes into contact with a pair of receiving rolls 7, 8. From the receiving rolls the dough passes to two sheet forming rolls 9 and 10 and thence to the large and small coiling rolls 11 and 12, respectively.

The large roll 11 is mounted on a shaft 13 driven by the gear 13ª meshing with the gear 2. The sheet forming roll 9 is on a shaft 14, which is driven by a gear 14ª meshing with an idler 15 from the gear 13ª. This idler also drives the shaft 16 through a gear 16ª, said shaft 16 serving to mount the other coil forming roll 12.

The idler 17 connects the gear 14ª with the gear 18ª on the shaft 18 of the receiving roll 7.

As will be noted the remainder of the gears in this portion of the machine are carried on swinging frames, said gears being adapted to swing in a planetary manner around certain of the gears now described.

Reverting to the receiving roll 8, the sheet forming roll 10 and the coil forming roll 12, it should be noted that a frame having side pieces 19 and a cross plate 20 is mounted to swing on the shaft 16 of the coil forming roll 12. The shafts 8ª and 10ª respectively of the rolls 8 and 10 are mounted to rotate in the said side pieces 19, and said shafts carry gears on their ends opposite to the gear case proper.

Thus the shaft 16 carries a gear 21, which meshes with the gear 22 of the roll shaft 10ª, while an idler 23 meshes with the gear 24 on the roll shaft 8ª.

Since the companion rolls to the rolls 8 and 10 are fixed in position, it is apparent that swinging of the frame pieces that carry said rolls 8 and 10 will alter at one and the same motion, the distance between the said rolls and their companion rolls such that if a fine sheet is desired for a piece of work, the receiving rolls will accomplish a part of the thinning out and will deliver the sheet to the sheet forming rolls in a condition which is more readily reduced to the exact dimension required.

To accomplish this motion of the frame I provide a shaft 25 extending across between the sides of the main frame, and on this shaft mount a pair of cams 26, which engage the sides of the frame. The frame naturally falls into an inclined position with the upper roll 8 tending to cause the frame to tip downwardly by gravity and thus the frame rests against these cams and will take the upright position enforced by the cam contact. The shaft 25 extends out through the side of the main frame and is there equipped with a calibrated dial 27, which revolves under a pointer 28, said shaft having a suitable handle 29.

By this means the operator can gain a perfect adjustment of the thickness of sheet by following out directions as to the proper calibration of the dial to be used in any one piece of work.

I mount on a pair of spring engaged rods 30, 30, a suitable scraper blade 31, which bears against the surfaces of the rolls 10 and 12, thereby maintaining both of them free of adherent dough, which might interfere with their action.

Another frame is provided having side bars or plates 32 and cross plates or bars 33 at top and bottom at the depending edges thereof, as well as another cross bar 34 toward the upper end. In the latter cross bar are mounted a pair of spring rods 34ª, which carry a scraper 35.

The frame is journaled on the shaft 14 of the fixed sheet forming roll 9 and depends therefrom. A pivoted rod 36 having an adjustable nut or head 37 is secured to the upper cross bar 33 and said nut has pins 38 carried on a loose collar thereon to engage notched plates 39 on the machine frame.

The frame carries also an idler gear 40, which meshes with the gear 41 on the shaft 14.

As in insert into the swinging frame I provide an open box frame structure 42 braced at 42ª, which at its outer end has squared openings within which are journaled boxes 43 held in place adjustably by threaded pins 44, which last extend across the openings. A roll shaft carrying a roll 45 is held in the said journals.

The box-like insert also carries a shaft 46, which mounts a roll 47, said rolls 47 and 45 having a belt 48 set around them. The shaft 46 has a gear 46ª on its end outside of the box frame member, which is to mesh with the idler 40 held on the swinging frame member.

To insert the box it is slid into the free end of the swinging frame and pushed inwardly until a latch pin 49 on the frame engages the outer wall of the box. When this occurs, the gears noted will be in mesh and will act in a planetary manner with the gear 41, so that the belt will be moved when the machine is in operation.

As a convenient method of retaining the box snugly in the swinging frame I may provide ribs 50 or flanges along the inner edge of the bottom frame pieces of said box, which engage along the inside of flanges 51 extending in from the side pieces of the swinging frame.

The belt lies in a position where dough, having been formed into a sheet, is trapped between the rolls 11 and 12 and coiled, is tripped out of the space between said rolls due to its increase in diameter and carried along by the belt over a deflector plate 52 and to the conveyor in the kneading member of the machine.

The method of adjusting the position of the swinging frame forms part of another invention, and is not claimed herein, but it will be noted particularly that the belt does no duty as a sheet forming roll and has an adjusting range of considerable scope due to this fact. The scraper above noted is mounted in the swinging frame and removes sticky dough from the sheet forming roll to which the frame is swung, same being another advantage over my former machines.

The ability to readily insert and remove the belt structure not only makes it very simple to keep it clean but also gives free access to the interior of the machine for cleaning the other parts thereof, when the box-like frame is withdrawn.

*The kneading devices.*

In the present machine I have made a considerable departure from machines of the past by the provision of means to permit a full kneading of the coils of dough formed in the machine parts now described without dragging the ends of the coils behind the balance thereof.

As in my former machines, I provide side bars 53 for the kneading frame or bed and a wavy plate or base 54, over which the coils of dough must pass. I also provide a conveyor belt 55, which takes the dough rolls or coils, made as heretofore noted, and carries them along over the said wavy base, there being a pressure board 56, which forces the coils against the conveyor and thus against the base.

This pressure board is set to the desired position over the conveyor dependent upon the thickness of the coils being run, as is the present practice in machines of this type.

Instead of fixed side boards set along the frame bars 53, I provide for movable side pieces and control their travel to exert just the correct drag on the coils of dough.

Thus I provide a set of rolls 57, which are to be mounted perpendicularly over the base of the kneader, said rolls having shafts 58, which are set into boxes 59 so as to be held dependently therein.

The boxes 59 are mounted to slide at right angles to the roll axes in mounting plates 60, there being a keyed relation as at 61.

The plates 60 have slotted portions 61$^a$, through which pass bolts 62 supported in the side bars 53 of the bed.

Over the rolls of which there are a pair at each end of the kneading device are set flexible belts 62$^a$, preferably of thin sawblade steel, and the adjustment of the mounting plates is such that these belts will lie alongside of the edges of the conveyor.

It should be noted that the conveyor 55 is held on rolls 63, 64, one at each end of the kneading device, and that a chain 64$^a$ mounted over suitable sprockets 65 energizes both rolls.

The roll 63 is mounted directly on the shaft 3 and the outer roll may have a shaft 65$^a$ which is adjustable as in my application for patent Serial No. 477,080, filed June 13, 1921.

It is from this shaft 65$^a$ that the side belts are driven, there being beveled gear devices 66 on the lower ends of the shafts of the outer pair of upright rolls.

Connecting the sliding journal boxes of the shafts of said upright rolls and extending along the sides of the kneading device bed are rods 67 connected by turn buckles 68 by means of which device the spacing of the rolls may be adjusted and the position of the driven rolls fixed by the use of screws 69 that bear against the journal boxes of the freely turning or idler perpendicular rolls.

When a coil of dough comes into the conveyor it meets the resistance of the pressure board, which causes it to revolve and presses it together with the conveyor against the wavy base piece. This action causes the coils to revolve and travel at the same time, the travel not being as rapid as the movement of the conveyor belt.

By arranging the beveled gear devices properly I accomplish a slower movement of the side belts than the movement of the conveyor, this side movement being as close as possible to the speed of travel of the coils of dough through the machine.

Thus the sides of the machine travel at the proper speed to make no drag either forward or rearward of the path of the coils and tend to preserve them in a straight line at all times. This provides a perfect coil ready for proofing, which has not been possible in any type of kneading device with which I am familiar.

To lubricate the side belts I provide wells 70 in the frames 53 containing some oil non-injurious to dough and set into these wells wipers 71 which contact with the outer surfaces of the belts. Also set into pockets in the frames 53 are scraper blades 74 pivotally held in the pockets and spring-pressed as at 75 against the belts.

In view of the fact that the sides of the kneader travel along with the dough, it is not necessary to have them lie over the conveyor belt, since they can lie alongside the belt without causing undue wear thereto along the edges.

I do not desire to be limited in the structure or method of driving the side belts, as there will be a wide range of structure which will accomplish the broad purpose of my invention in this regard.

Neither do I desire failure to mention equivalent structures throughout to be considered as acting as a limitation to the range of usual equivalents in the claims that follow.

Having thus described my invention, what I claim as new and desire to secure by Letters Patent, is:—

1. In a dough molder, a pair of receiving rolls and a pair of sheet forming rolls adapted to take a sheet of dough from the receiving rolls, one of each pair of rolls being stationary and the other of each pair being adjustable to vary its space from its companion roll, a swinging frame having its center beneath the sheet forming roll, and both of said adjustable rolls mounted in said frame, and means for controlling the position of said frame, said frame and means constituting the adjusting devices for the said rolls, and said controlling means comprising a rotary member and a calibrated indicator to give readings of the nature of the adjustment.

2. In a dough molder, a pair of receiving rolls and a pair of sheet forming rolls adapted to take a sheet of dough from the receiving rolls, one of each pair of rolls being stationary and the other of each pair being adjustable to vary its space from its companion roll, a swinging frame having its center beneath the sheet forming roll, and both of said adjustable rolls mounted in said frame, and means for controlling the position of said frame, said frame and means constituting the adjusting devices for the said rolls, and said controlling means comprising a cam or cams in contact with said frame, a shaft carrying said cams, and a dial on said shaft calibrated to give readings of the nature of the adjustment.

3. In combination with a device for forming a coil of dough, a trip belt mechanism therefor, comprising an adjustable frame, an additional frame adapted to be demountably secured in the first mentioned frame, and a belt and devices for moving the same mounted in the said additional frame.

4. In combination with a device for forming a coil of dough, a trip belt mechanism therefor, comprising an adjustable frame, an additional frame adapted to be demountably secured in the first mentioned frame, and a belt and devices for moving the same mounted in the said additional frame, said operating devices for the belt having a driving gear, and the first mentioned frame having an idler gear adapted to mesh with said driving gear, and means for imparting motion to the idler gear.

5. In combination with a device for forming a coil of dough, a trip belt mechanism therefor, comprising a frame hinged to swing in an arc, an additional frame adapted to be inserted into the swinging frame, a pair of rolls and a belt in the additional frame, and planetary driving means for the said rolls.

6. In combination with a device for forming a coil of dough, a trip belt mechanism therefor, comprising a frame hinged to swing in an arc for adjusting its position, an additional frame, said first mentioned frame having guideways into which the additional frame may be slid and locked in place, a pair of rolls and a belt in the additional frame, and planetary driving means for the said rolls.

7. In a machine of the character described, the combination with a casing, of a receiving roll, and sheet forming roll and coiling rolls mounted on fixed axes in said casing, a frame pivoted on the axis of the one coiling roll, and an additional receiving roll and sheet forming roll therein, means for adjusting said frame to bring the said rolls into desired spaced juxtaposition with the fixed rolls of like character, a frame swung from the fixed sheet forming roll, a pair of belt rolls and a belt thereon carried by said last mentioned frame, and means for adjusting the said frame to desired spaced juxtaposition with the pocket left between the coiling rolls to act as a trip therefrom.

FRANK X. LAUTERBUR.